Figure 1:
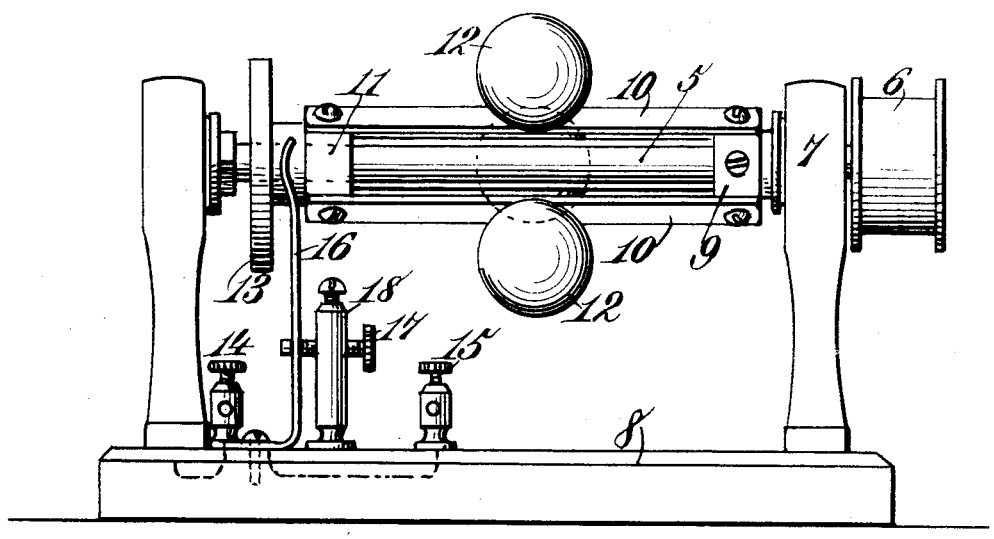

No. 791,435. PATENTED MAY 30, 1905.
B. G. BARLOW.
ELECTRIC SPEED LIMITING DEVICE.
APPLICATION FILED DEC. 9, 1904.

Witnesses.
Robert Everitt,
James L. Norris, Jr.

Inventor.
Bertus G. Barlow.
By James L. Norris
Atty.

No. 791,435.

Patented May 30, 1905.

UNITED STATES PATENT OFFICE.

BERTUS G. BARLOW, OF MANCHESTER, NEW HAMPSHIRE.

ELECTRIC SPEED-LIMITING DEVICE.

SPECIFICATION forming part of Letters Patent No. 791,435, dated May 30, 1905.

Application filed December 9, 1904. Serial No. 236,225.

*To all whom it may concern:*

Be it known that I, BERTUS G. BARLOW, a citizen of the United States, residing at Manchester, in the county of Hillsboro and State of New Hampshire, have invented new and useful Improvements in Electric Speed-Limiting Devices, of which the following is a specification.

This invention relates to what I shall for convenience term an "electric speed-limiting device," and while it may be successfully employed in many connections I have found it of particular utility in connection with an apparatus such as that disclosed by Letters Patent No. 745,763, granted to me December 1, 1903, and to which reference may be had.

The apparatus involves in its organization a centrifugal governor, a disk coöperative therewith and laterally movable thereby, and a contact device arranged to be engaged by a side face of the disk on the lateral motion thereof. The disk and contact are electrically connected with a source of electric energy and with a magnet or equivalent device, so that when they are brought in contact the circuit involving the same is closed in order to effect the action of the magnet and the consequent operation of a clutch or equivalent device to stop the motion of a machine, which machine may be a steam-engine, a motor, or anything of a similar or analogous character.

In the drawings accompanying and forming a part of this specification I have selected for illustration a simple and convenient adaptation involving my invention, which I will fully set forth in the following description; but I do not limit myself to the showing thus made, for certain variations may be adopted within the scope of my claims succeeding said description.

Figure 2:
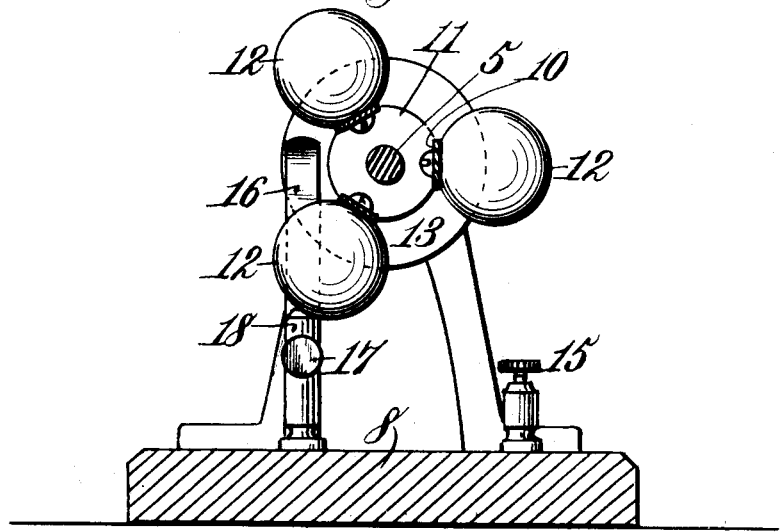

Referring to the drawings, Figure 1 is a front elevation of an electric speed-limiting device involving my invention. Fig. 2 is a transverse sectional elevation of the same.

Like characters refer to like parts throughout the views.

The device is represented as including in its make-up a shaft, as 5, which is power-driven—that is to say, it is operatively connected with a motor with which the device is associated. The motor of course is not illustrated; but it may be connected with the shaft by a belt. For this purpose I have represented one end of the shaft as equipped with a pulley or band wheel, as 6. The shaft is rotatably supported by hangers or other suitable bearings, as 7, fastened in some convenient way to the board 8.

Suitably fastened to the shaft 5 at a desirable point thereon is a sleeve or band, as 9, to the periphery of which are shown secured one end of each of a number of spring-strips 10. The opposite ends of these spring-strips 10 are represented as similarly fastened to the periphery of a sleeve, as 11, capable of sliding movement on the shaft 5 longitudinally thereof. The spring-strips 10 carry between their ends and on the outer sides thereof weights, as 12, represented as of substantially spherical form and rigidly associated with the respective springs in any desirable way. The sleeve 11 is circumferentially reduced, and the outer end of the reduced portion thereof is provided with a disk 13, through which the shaft 5 passes. In other words, there is a contact between the disk 13 and shaft. Ordinarily the sleeve 11 and disk 13 are made of brass and integral. When the shaft 5, with which the sleeve 9 rotates, exceeds a certain or predetermined speed, the governor weights or balls 12 are by virtue of the resiliency of the strips 10, connecting the two sleeves, swung outward, the result being that the disk 13 is moved laterally or longitudinally of the shaft 5. The reason of this will be hereinafter set forth.

The board 8 is provided on its outer surface with binding-posts, as 14 and 15, the binding-post 14 being connected with the hanger 7 on the left by a suitable conductor, while the binding-post 15 is connected by a similar conductor with the spring-contact 16, the flattened base of which is attached in some desirable way to the board 8. The two posts 14 and 15 and the spring contact-arm 16 and the hanger 7 on the right are insulated from each other and constitute part of an open circuit which is closed by the engagement of the disk 13 with the outer or free end of the spring contact arm or device 16, said outer or free end being curved to present a proper surface to be engaged by the disk. By reason of the fact that I provide a circuit-controlling device, governor-operated, in the form of a disk I am enabled while the disk is in engagement with the free end of the contact spring arm or device 16 to maintain an unbroken or continuous engagement between such parts, so as absolutely to assure the closure of the electric circuit and the maintenance of such relation for a time sufficient to secure the operation of a magnet or equivalent element. Conductors (not illustrated) may run from the two posts 14 and 15 to a battery and magnet or similar parts in the manner shown in the patent to which I have hereinbefore referred, so that when the circuit is closed by the engagement of the disk 13 under the action of the governor with the contact-spring 16 said magnet will be energized to effect the stopping of a motor. When the motor stops, the governor-balls 12 of course are returned to their original positions by the straightening of the resilient strips 10, which operation carries the disk 13 out of contact with the spring-arm 16, whereby the original relation can be resumed or until the speed of the motor exceeds a certain point. To adjust the time of engagement between the contact 16 and the disk 13, I illustrate a screw, as 17, tapped through the post 18 and connected with the said contact 16 near the base. By the manipulation of the screw 17 the head or bent portion of the contact can be moved toward and from the disk 13 to adjust the time of contact between such parts.

Having thus described my invention, what I claim is—

1. An electric speed-limiting device involving a centrifugal governor, a disk coöperative with said governor and laterally movable thereby, and a contact device arranged to be engaged by a side face of the disk on the lateral motion thereof the disk being rotative by the governor during such engagement to maintain an unbroken contact between the disk and contact member.

2. An electric speed-limiting device involving a centrifugal governor, a disk coöperative with said governor and laterally movable thereby, a contact device arranged to be engaged by a side face of the disk on the lateral motion thereof the disk being rotative by the governor during such engagement to maintain an unbroken contact between the disk and contact member, and means for adjusting the contact device with respect to the disk to regulate the time of contact therebetween.

3. An electric speed-limiting device involving a centrifugal governor, a disk rotative therewith and laterally movable thereby, and a contact device arranged to be engaged by a side face of the disk on the lateral motion thereof and the contact being unbroken during such engagement.

4. An electric speed-limiting device involving a shaft, sleeves on said shaft, one fixed thereto and the other slidable thereon, spring-strips connecting the sleeves and provided with governor-weights, a disk associated with the slidable sleeve, and a contact device arranged for engagement by a side face of said disk and the contact being unbroken during such engagement.

In testimony whereof I have hereunto set my hand in presence of two subscribing witnesses.

BERTUS G. BARLOW.

Witnesses:
ROBERT L. MANNING,
VELMER PRINCE.